(12) United States Patent
Nardiello et al.

(10) Patent No.: US 10,173,410 B2
(45) Date of Patent: Jan. 8, 2019

(54) DEVICE AND METHOD FOR 3D PRINTING WITH LONG-FIBER REINFORCEMENT

(71) Applicant: Northrop Grumman Systems Corporation, Falls Church, VA (US)

(72) Inventors: Jerrell A. Nardiello, Hicksville, NY (US); Robert J. Christ, Brentwood, NY (US); John A. Crawford, Miller Place, NY (US); John S. Madsen, Commack, NY (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 444 days.

(21) Appl. No.: 14/961,989

(22) Filed: Dec. 8, 2015

(65) Prior Publication Data

US 2017/0157851 A1 Jun. 8, 2017

(51) Int. Cl.
*B29C 67/00* (2017.01)
*B33Y 10/00* (2015.01)
(Continued)

(52) U.S. Cl.
CPC ............ *B33Y 30/00* (2014.12); *B29C 47/128* (2013.01); *B29C 64/165* (2017.08); *B29C 64/20* (2017.08);
(Continued)

(58) Field of Classification Search
CPC ... B29C 64/118; B29C 64/209; B29C 47/028; B29C 47/08; B29C 47/067; B29C 47/04;
(Continued)

(56) References Cited

U.S. PATENT DOCUMENTS 2,800,683 A * 7/1957 Teichmann ........... B29C 47/023
156/143
3,375,550 A * 4/1968 Klein .................... B29C 47/023
425/114
(Continued)

FOREIGN PATENT DOCUMENTS

DE 102010049195 11/2012

OTHER PUBLICATIONS

Gray IV, R. et al; Effects of processing conditions on short TLCP fiber reinforced FDM parts; Rapid Prototyping Journal, vol. 4, No. 1, 1998; pp. 14-25; MCB University Press—ISSN 1355-2546.
(Continued)

*Primary Examiner* — Yogendra N Gupta
*Assistant Examiner* — Emmanuel S Luk
(74) *Attorney, Agent, or Firm* — Patti & Malvone Law Group, LLC

(57) ABSTRACT

A process and device for 3D printing parts incorporating long-fiber reinforcements in an advanced composite material is disclosed. A nozzle for a 3D printing device receives a polymer material and a reinforcing fiber through separate inlets. A passage from the reinforcing fiber inlet cleaves the passage containing the polymer material, creating an interstitial cavity into which the reinforcing fiber is introduced. The polymer material closes back on itself and encapsulates the reinforcing fiber, then drags the fiber along with the flow and exits nozzle to be deposited on a work surface or part being manufactured.

25 Claims, 3 Drawing Sheets

(51) Int. Cl.
  *B33Y 30/00* (2015.01)
  *B29C 47/12* (2006.01)
  *B29C 64/165* (2017.01)
  *B29C 64/20* (2017.01)
  *B29C 64/40* (2017.01)
  *B29K 101/10* (2006.01)
  *B29K 105/08* (2006.01)

(52) U.S. Cl.
  CPC .............. *B29C 64/40* (2017.08); *B33Y 10/00* (2014.12); *B29K 2101/10* (2013.01); *B29K 2105/08* (2013.01)

(58) Field of Classification Search
  CPC ..... B29C 47/027; B29C 64/165; B29C 64/20; B29C 64/40
  See application file for complete search history.

(56) References Cited

U.S. PATENT DOCUMENTS

| | | | | |
|---|---|---|---|---|
| 3,558,754 | A * | 1/1971 | Klein | A41D 31/02 264/171.12 |
| 3,961,873 | A * | 6/1976 | Brown | B29C 47/023 156/431 |
| 4,439,387 | A * | 3/1984 | Hawley | B29C 47/027 264/108 |
| 4,472,126 | A * | 9/1984 | Mitsui | B29C 47/023 156/149 |
| 4,764,324 | A * | 8/1988 | Burnham | A61M 25/0012 264/103 |
| 4,864,964 | A * | 9/1989 | Hilakos | B29B 15/122 118/117 |
| 5,650,224 | A * | 7/1997 | March | B29C 47/0016 425/63 |
| 5,779,961 | A * | 7/1998 | Teutsch | B29C 47/003 264/176.1 |
| 5,783,125 | A * | 7/1998 | Bastone | B29C 47/0016 264/171.12 |
| 5,792,401 | A * | 8/1998 | Burnham | A61M 25/0012 264/103 |
| 6,214,279 | B1 | 4/2001 | Yang et al. | |
| 6,863,729 | B2 * | 3/2005 | McCullough | B29C 47/20 118/125 |
| 8,751,018 | B1 * | 6/2014 | Sethna | A61N 1/05 607/119 |
| 9,126,365 | B1 * | 9/2015 | Mark | B29C 70/20 |
| 9,126,367 | B1 * | 9/2015 | Mark | B29C 70/20 |
| 9,770,876 | B2 * | 9/2017 | Farmer | B29D 99/0078 |
| 9,931,776 | B2 * | 4/2018 | Butcher | B29C 47/0014 |
| 2007/0170610 | A1 | 7/2007 | Payne et al. | |
| 2012/0159785 | A1 | 6/2012 | Pyles et al. | |
| 2013/0337256 | A1 * | 12/2013 | Farmer | B29C 47/0002 428/292.1 |
| 2014/0027952 | A1 | 1/2014 | Fan et al. | |
| 2014/0232035 | A1 * | 8/2014 | Bheda | B29C 67/0088 264/148 |
| 2014/0361460 | A1 * | 12/2014 | Mark | B29C 70/521 264/248 |
| 2015/0108677 | A1 * | 4/2015 | Mark | B29C 70/20 264/138 |
| 2015/0165666 | A1 * | 6/2015 | Butcher | B29C 47/0014 428/373 |
| 2016/0082641 | A1 * | 3/2016 | Bogucki | B29C 47/0004 427/422 |
| 2016/0136897 | A1 * | 5/2016 | Nielsen-Cole | B33Y 30/00 425/131.1 |
| 2016/0311165 | A1 * | 10/2016 | Mark | B33Y 10/00 |
| 2017/0015059 | A1 * | 1/2017 | Lewicki | B29C 64/118 |
| 2017/0015060 | A1 * | 1/2017 | Lewicki | B29C 64/209 |
| 2017/0066187 | A1 * | 3/2017 | Mark | B29C 64/106 |
| 2017/0252967 | A9 * | 9/2017 | Guillemette | B29C 64/118 |
| 2017/0341300 | A1 * | 11/2017 | Rudolph | B29C 64/386 |
| 2017/0368739 | A1 * | 12/2017 | Brennan | B33Y 10/00 |
| 2018/0036952 | A1 | 2/2018 | Hocker | B29C 64/40 |

OTHER PUBLICATIONS

Zhong, W. et al; Research on Rapid-Prototyping/Part Manufacturing (RP&M) for the Continuous Fiber Reinforced Composite; Materials and Manufacturing Processes, vol. 16, Issue 1, 2001, pp. 17-26; 2007 by Marcel Dekker, Inc.

* cited by examiner

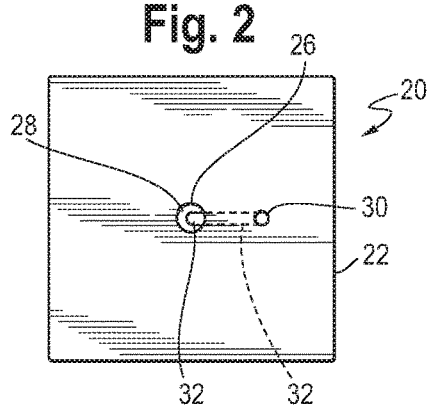
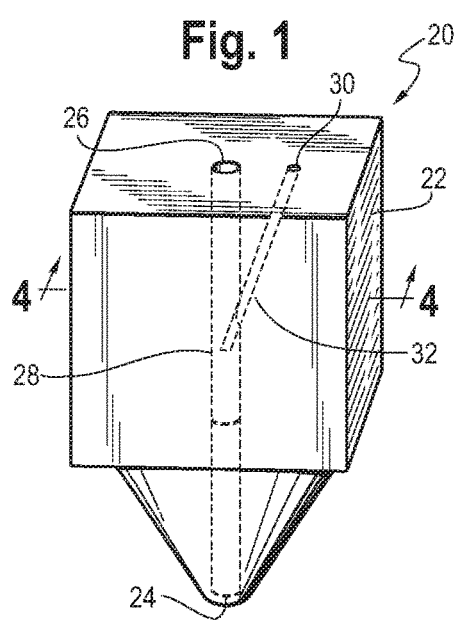
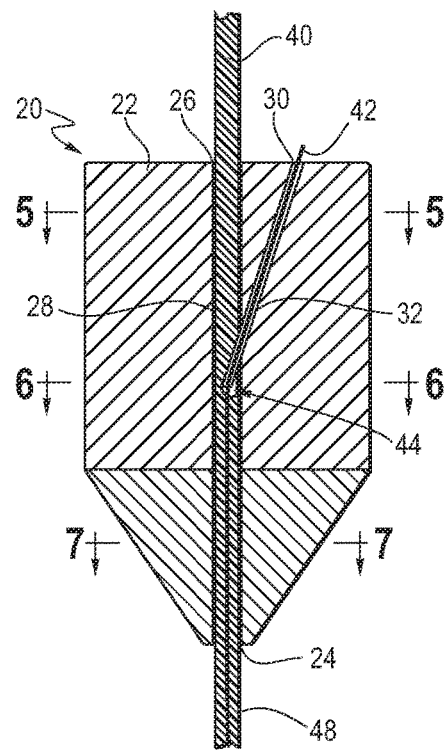
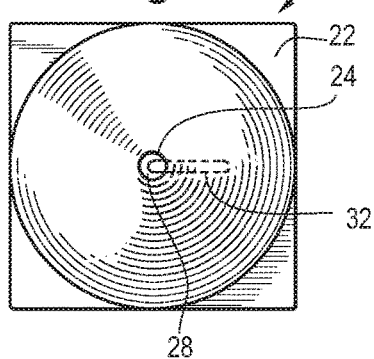

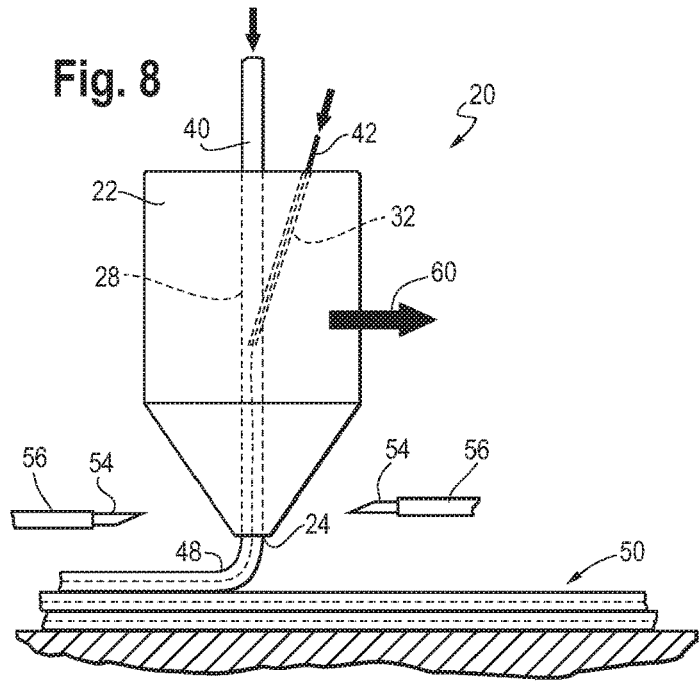
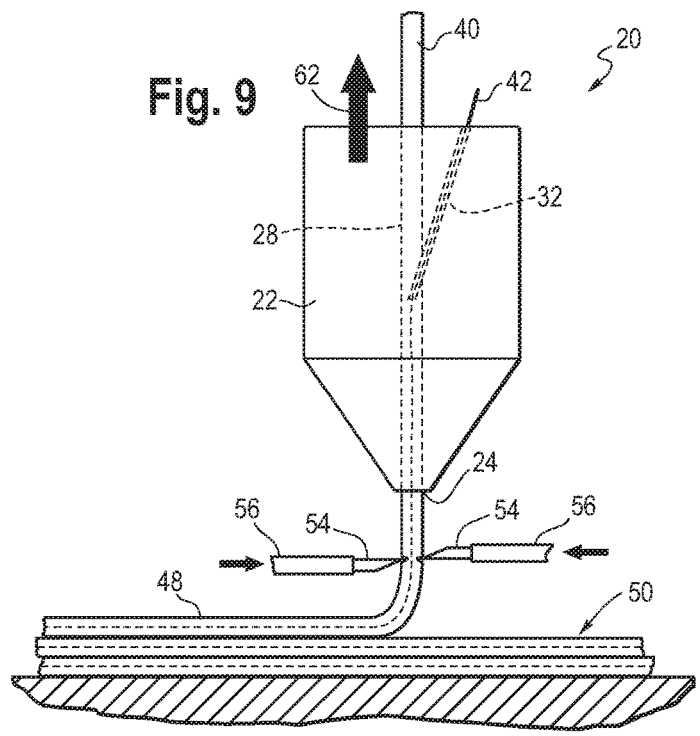

DEVICE AND METHOD FOR 3D PRINTING WITH LONG-FIBER REINFORCEMENT

FIELD OF THE INVENTION

The invention relates generally to three-dimensional (3D) printers and more particularly to 3D printing with long-fiber reinforcement.

BACKGROUND OF THE INVENTION

A number of technologies are used to manufacture non-metallic structural components capable of sustaining significant loads. Typically these involve composite materials that combine a resin with some type of fiber reinforcement. Advanced composites have been developed that use expensive, high-performance resins and fiber reinforcement with properties of high strength and stiffness. The design and manufacturing of advanced composites usually employ very complicated processes and machinery that involve saturating the fiber with the resin, then causing the resin to bind, typically in a mold apparatus. For most manufacturing processes, thermoset resins, and increasingly thermoplastic resins, require immense hand labor to fabricate, multiple repetitive processes, and often autoclave (pressure vessel) curing. This is an expensive and time consuming process, with little room for error.

One technique for manufacturing advanced composites is referred to as Laminated Object Manufacturing (LOM). This technology applies a full "ply" of material, with some sort of integral adhesive onto a tool-less platen, and cuts the ply (by laser, knife, etc.) to the final shape. Repeating this process several times eventually results in the buildup of enough thickness to contain the finished part. During lamination, unwanted areas are scored in a square/rectangular pattern, and after lamination the part is "de-cubed" to remove the unwanted areas from the monolithic block, revealing the finished part. This technique only allows for entire plies to be placed, and not individual fibers, and generates a large amount of waste material in the "cubing/de-cubing" process. In addition, any given ply will have only one fiber orientation.

Fiber/tow placement is a technique wherein an individual fiber, or tow, pre-impregnated with resin is placed in, or on, a tool or mold that contains the basic shape, and this process usually employs thermoset materials. It is somewhat akin to a mechanized version of hand layup.

Filament winding is similar to fiber placement, except that this process is more amenable to cylindrical shaped objects (not just circular cylinders, but any cross section cylinder.) As in fiber placement, a tool (mold) is required, and the process is typically employed with thermoset materials.

Recently, 3D printing devices have become widely used, to the point of being available as affordable desktop models for the average hobbyist. Their utility is also clear beyond being a novelty, as they are used to create medical prostheses, dental implants, master models for lost-wax casting processes, and a host of other useful embodiments. However, all of these 3D printed items lack one important attribute, the ability to be used as structural components with significant loads beyond simple low compressive loading. In order to be used as viable structural components the some form of long-fiber reinforcement needs to be introduced using, for example, one of the techniques described above.

Fiber Reinforced Advanced Composites are ubiquitous throughout our present day experiences, in automobiles, aircraft, and increasingly in civil structures. But, these advanced composites typically come with a large price tag (due in part to increased material, design, and manufacturing costs) that is significantly beyond that of the metallic structures they replace. Manufacturing decisions must determine whether the increased performance provided by fiber reinforced advanced composites justifies the increased cost. In addition, there is a middle ground where high performance composites are not required but a medium-duty fiber reinforced 3D printed part would be useful. These parts could be made from a variety of thermoplastic materials, along with a variety of fiber materials (different base material, woven or not, etc.).

The manufacturing cost of fiber reinforced advanced composites would be significantly reduced by the 3D printing process, eliminating much of the tooling needed for conventional parts, and most of the processing needed for conventional advanced composites.

Thus, a need exists for a device and method for producing long-fiber reinforced 3D printed components that eliminates most, if not all, of the hand labor and tooling, and can offer improved dimensional accuracy on fiber location with reduced cost. There is a further need for a device and method where the 3D printed part can have fibers oriented any desired direction within each individual layer.

SUMMARY OF THE INVENTION

The invention in one implementation encompasses a process and device for 3D printing parts incorporating long-fiber reinforcements in an advanced composite material.

In an embodiment the invention encompasses a nozzle for use in a three-dimensional (3D) printing device, the nozzle having a filament inlet for introducing a polymer material into the nozzle; a filament passage extending vertically through the nozzle wherein the polymer material is heated at least to its melting point; a fiber inlet adjacent to the filament inlet for introducing a fiber to the nozzle; a fiber passage extending from the fiber inlet at an angle and intersecting the filament passage such that a fiber in the fiber passage is introduced into the molten polymer material and encapsulated; an outlet for extruding the encapsulated fiber onto a work surface; and a cutting device between the outlet and the work surface for severing the encapsulated fiber.

In a further embodiment, the invention encompasses a nozzle for use in a three-dimensional (3D) printing device, the nozzle having a resin inlet for introducing a viscous thermosetting resin into the nozzle; a resin passage extending vertically through the nozzle from the resin inlet; a fiber inlet adjacent to the resin inlet for introducing a fiber to the nozzle; a fiber passage extending from the fiber inlet at an angle and intersecting the resin passage such that a fiber in the fiber passage is introduced into the viscous thermosetting resin and encapsulated; an outlet for extruding the encapsulated fiber onto a work surface; and a cutting device between the outlet and the work surface for severing the encapsulated fiber.

In a further embodiment, the polymer material is a thermoplastic filament, for example, PLA (polylactic acid), ABS (acrylonitrile butadiene styrene), PEI (Polyetherimide), nylon, polystyrene, PEEK (polyetherether ketone), PEKK (polyether ketone ketone) or PES (polyether sulfone).

In another embodiment, the viscous thermosetting resin is, for example, epoxy, polyester, urethane/polyurethane, phenolic, polyimide or cyanate ester/polycyanurate.

In yet another embodiment, the reinforcing fiber is, for example, fiberglass, carbon, aramid, polyester and cotton or other plant-based fibers.

In another embodiment, the fiber passage extends into the polymer or resin passage so that the molten or viscous material is cleaved before the fiber is introduced.

In yet another embodiment, the nozzle is retracted away from the work surface before the encapsulated fiber is severed.

In an embodiment, the invention encompasses a method for three-dimensionally (3D) printing an advanced composite part, including the steps of introducing filament polymer material into a first passage of a nozzle of a 3D printing device; melting the polymer material as it moves through the first passage; introducing a reinforcing fiber into a second passage of the nozzle; introducing the reinforcing fiber into the molten polymer material at an interstitial cavity formed by the second passage, wherein the molten polymer material encapsulates the reinforcing fiber to create an advanced composite; and depositing the advanced composite onto a work surface to form the advanced composite part.

In yet another embodiment, the invention encompasses a method for three-dimensionally (3D) printing a fiber-reinforced advanced composite part, including the steps of introducing viscous thermosetting resin into a first passage of a nozzle of a 3D printing device; introducing a reinforcing fiber into a second passage of the nozzle; introducing the reinforcing fiber into the viscous thermosetting resin at an interstitial cavity formed by the second passage, wherein the viscous thermosetting resin encapsulates the reinforcing fiber to create an advanced composite; and depositing the advanced composite on a work surface to form the advanced composite part.

In an embodiment, the method includes the step of moving the nozzle over the work surface in a set of motion commands to create the advanced composite part.

In a further embodiment, the method includes the step of using a cutting device to sever the advanced composite at the end of a motion command.

In another embodiment, the method includes the step of optimizing the set of motion commands to eliminate termination points and make the advanced composite part in long continuous motions, for example, moving the nozzle in a serpentine path back and forth across the work surface.

BRIEF DESCRIPTION OF THE DRAWINGS

Features of example implementations of the invention will become apparent from the description, the claims, and the accompanying drawings in which:

FIG. 1 depicts a nozzle for 3D printing long-fiber reinforced parts according to the present invention.

FIG. 2 depicts a top view of the nozzle of FIG. 1.

FIG. 3 depicts a bottom view of the nozzle of FIG. 1.

FIG. 4 depicts a cross-sectional view of the nozzle of FIG. 1 taken at line 4-4.

FIG. 8 depicts a side view of the nozzle of FIG. 1 during a 3D printing operation.

FIG. 9 depicts a further view of the printing operation of FIG. 8.

DETAILED DESCRIPTION OF THE INVENTION

Figure 5:
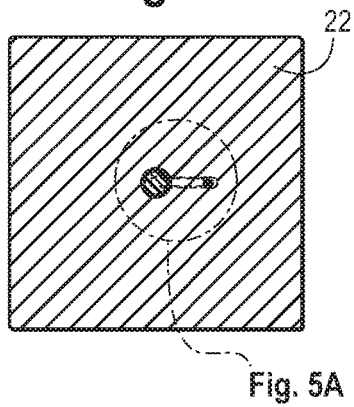
FIG. 5 depicts a horizontal cross sectional view of the nozzle of FIG. 1 taken at line 5-5 in FIG. 4.

If used and unless otherwise stated, the terms "upper," "lower," "front," "back," "over," "under," and similar such terms are not to be construed as limiting the invention to a particular orientation. Instead, these terms are used only on a relative basis.

FIG. 1 depicts a nozzle 20 for use in a 3D printing apparatus. Nozzle 20 has a nozzle body 22. Although representative outer shapes for nozzle 20 and nozzle body 22 are shown, one of ordinary skill in the art would understand that a variety of shapes, for example, a cylinder, could be used.

Nozzle body 22 includes an inlet 26 for receiving a filament to be used in 3D printing. In an embodiment, the filament is a thermoplastic filament, but as an alternative, a thermosetting resin or other similar polymer material could be used. The following discussion relates to the thermoplastic filament embodiment, modifications for using the invention with a thermosetting resin are discussed below. After entering filament inlet 26, the filament is melted as it moves through passage 28 and exits nozzle outlet 24 as explained below in connection with FIGS. 8 and 9. Although nozzle 20 and passage 28 are depicted as generally vertical, one of ordinary skill in the art would recognize that a variety of orientations could be used.

Nozzle body 22 also includes fiber inlet 30 for receiving a reinforcing fiber. Passage 32 extends from fiber inlet 30 at an angle through nozzle body 22 to intersect with filament passage 28.

A top view of nozzle 20 is shown in FIG. 2. Filament inlet 26 and fiber inlet 30 are generally adjacent to each other. Although specific positions are shown, one of ordinary skill in the art would understand that fiber inlet 30 could be located in a number of positions within nozzle body 22. A bottom view of nozzle 20 showing, in particular, nozzle outlet 24, is shown in FIG. 3.

FIG. 4 depicts a cross sectional of nozzle 20, taken along line 4-4 of FIG. 1. A flexible reinforcing fiber 42 is introduced into the passage 32 via fiber inlet 30. Subsequently, a thermoplastic filament at room temperature is pushed into the nozzle 20 via filament inlet 26 by an external extruder (not shown), and is melted as would be understood by one of ordinary skill in the art. The molten thermoplastic is cleaved by the end of the fiber passage 32 creating an interstitial cavity 44 into which the fiber can be fed. Thereafter, the molten filament closes back on itself and encapsulates the fiber as further described in connection with FIGS. 5-7. The molten filament 48 then drags the fiber along with the flow, and exits nozzle 20 through outlet 24 as advanced composite 48 to be deposited on a work surface or part being manufactured. In an embodiment, reinforcing fiber 42 is pre-treated with a sizing or coating that bonds with the thermoplastic filament. Other than the presence of the reinforcing fiber, the deposition process is done in the similar manner to conventional monolithic 3D printing processes as further described in connection with FIGS. 8-9.

Figure 5A:
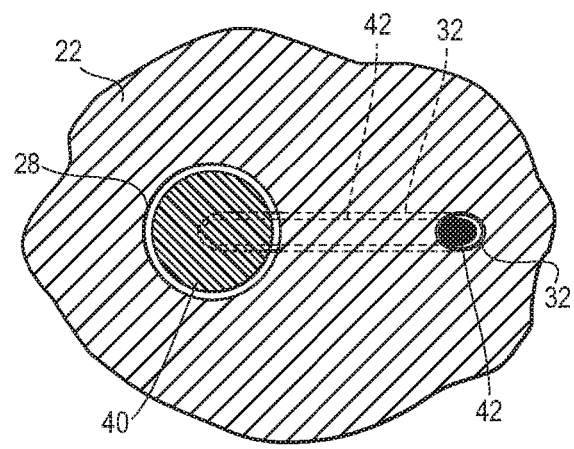
FIG. 5A depicts an expanded view of FIG. 5.

FIGS. 5 and 5A depict a horizontal cross sectional view of the nozzle body 22 taken at line 5-5 of FIG. 4. Thermoplastic filament 40 is in filament passage 28 and entering a molten state while reinforcing fiber 42 is passing through fiber passage 32.

Figure 6:
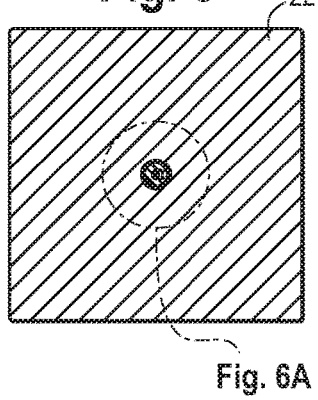
FIG. 6 depicts a horizontal cross sectional view of the nozzle of FIG. 1 1 taken at line 6-6 in FIG. 4.
Figure 6A:
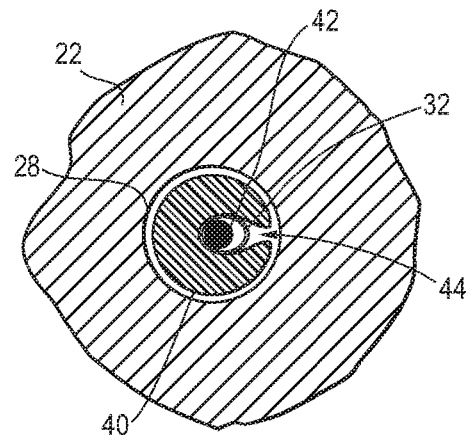
FIG. 6A depicts an expanded view of FIG. 6.

FIGS. 6 and 6A depict a horizontal cross sectional view taken at line 6-6 of FIG. 4. Fiber passage 32 has cleaved molten filament 40 to form interstitial cavity 44 into which fiber 42 is being fed.

Figure 7:
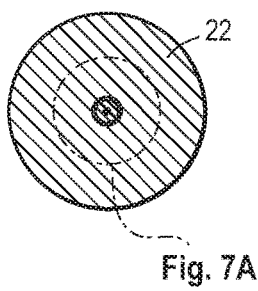
FIG. 7 depicts a horizontal cross sectional view of the nozzle of FIG. 1 taken at line 7-7 in FIG. 4.
Figure 7A:
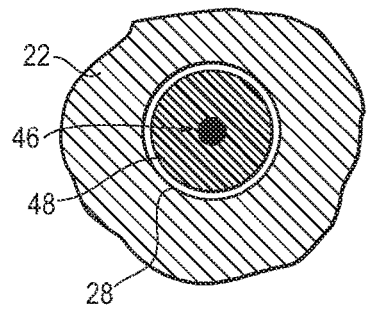
FIG. 7A depicts an expanded view of FIG. 7.

FIGS. 7 and 7A depict a horizontal cross sectional view taken at line 7-7 of FIG. 4. The molten filament has closed back on itself and encapsulated fiber 46 within filament passage 28 to form advanced composite 48, before being dispensed through outlet 24, shown in FIGS. 1 and 4.

The 3D printing operation of nozzle 20 is depicted in FIG. 8. Thermoplastic filament 40 and reinforcing fiber 42 enter nozzle body 22 through passages 28 and 32, respectively. Advanced composite 48 is dispensed through outlet 24 to form 3D printed part or laminate 50. Nozzle 20 is moving in the direction of arrow 60 in FIG. 8, but one of ordinary skill in the art would understand that nozzle 20 could be controlled to move in any direction, as needed.

One feature of the invention that differs from conventional non-reinforced 3D printing is that reinforcing fiber 42 must be cut at the end of a set of motion commands, before picking the head up to jog over to another area of the part. In conventional 3D printing the thermoplastic filament flow is terminated momentarily to avoid stray "threads" of material being dragged across the part. In an embodiment, a similar control signal to the one that tells the printer to terminate material flow is also used to signal an actuated knife blades 54, 56, or other type of cutter, to cut advanced composite 48 at the end of the nozzle.

FIG. 9 depicts a position of nozzle 20 and knife blades 54 during a cutting operation. In an embodiment, nozzle 20 is retracted in the direction of arrow 62 while actuators 56 cause knife blades 54 to move forward, severing advanced composite 48. After the cutting operation, a small piece of fiber-reinforced filament 48 is left to serve as the start of a next run. As an alternative, other types of cutting devices could be used, and nozzle 20 may not need to be retracted during a cutting operation.

In an embodiment, many of the cutting operations required to manufacture a part are mitigated by optimizing the software routine that lays out the nozzle paths, in order to eliminate termination points and make the part in fewer long continuous motions. For example, fiber runs can be made continuous by plotting a serpentine path back and forth across the part surface.

Numerous alternative implementations of the present invention exist. A variety of flexible reinforcing fibers could be used including, for example, fiberglass, carbon, aramid, polyester and cotton or other plant-based fibers. Representative thermoplastic resins include at least PLA (polylactic acid), ABS (acrylonitrile butadiene styrene), PEI (Polyetherimide), nylon, polystyrene, PEEK (polyetherether ketone), PEKK (polyether ketone ketone) and PES (polyether sulfone).

Although the embodiments above are described as using a thermoplastic filament, the inventive 3D printing nozzle for producing fiber-reinforced thermoplastic composites could be adapted to allow for the use of thermosetting resins or other polymer materials as well. For example, this would involve the use of a thermosetting resin available in a form that would remain relatively viscous at room temperature, then be able to be post-cured free-standing in an oven. As an alternative, when dispensing the viscous thermosetting resin, heat could be applied at the nozzle to begin the cure process, which is referred to as B-staging the resin. This would stiffen it up enough to better hold its shape and bond the layers together until it is fully post-cured at a later time. Some representative resins that could be used include epoxy, polyester, urethane/polyurethane, phenolic, polyimide and cyanate ester/polycyanurate. In an embodiment, thermoset resins would need to be relatively solid, or viscous, at room temperature, to be able to be extruded. Any resins not meeting this criterion would have to be modified for use with the inventive nozzle.

Nozzle 20 and its associated 3D printing device in one example comprises a plurality of components such as one or more of electronic components, hardware components, and computer software components. A number of such components can be combined or divided in nozzle 20. Nozzle 20 in one example comprises any (e.g., horizontal, oblique, or vertical) orientation, with the description and figures herein illustrating one example orientation of the nozzle 20, for explanatory purposes.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A nozzle for use in a three-dimensional (3D) printing device, comprising:
    a filament inlet for introducing a polymer material into the nozzle;
    a filament passage extending vertically through the nozzle wherein the polymer material is heated at least to its melting point;
    a fiber inlet adjacent to the filament inlet for introducing a fiber to the nozzle;
    a fiber passage extending from the fiber inlet at an angle and extending partially into the filament passage such that the molten polymer material is cleaved by the fiber passage and a fiber in the fiber passage is introduced into the molten polymer material and encapsulated;
    an outlet for extruding the encapsulated fiber onto a work surface; and
    a cutting device between the outlet and the work surface for severing the encapsulated fiber.

2. The nozzle of claim 1 wherein the polymer material is a thermoplastic filament.

3. The nozzle of claim 2 wherein the thermoplastic filament further comprises PLA (polylactic acid), ABS (acrylonitrile butadiene styrene), PEI (Polyetherimide), nylon, polystyrene, PEEK (polyetherether ketone), PEKK (polyether ketone ketone) or PES (polyether sulfone).

4. The nozzle of claim 1 wherein the fiber further comprises fiberglass, carbon, aramid, polyester and cotton or other plant-based fibers.

5. The nozzle of claim 1 wherein the nozzle is retracted away from the work surface before the encapsulated fiber is severed.

6. A nozzle for use in a three-dimensional (3D) printing device, comprising:
    a resin inlet for introducing a viscous thermosetting resin into the nozzle;
    a resin passage extending vertically through the nozzle from the resin inlet;
    a fiber inlet adjacent to the resin inlet for introducing a fiber to the nozzle;

a fiber passage extending from the fiber inlet at an angle and extending partially into the resin passage such that the viscous thermosetting resin is cleaved by the fiber passage and a fiber in the fiber passage is introduced into the viscous thermosetting resin and encapsulated;

an outlet for extruding the encapsulated fiber onto a work surface; and a cutting device between the outlet and the work surface for severing the encapsulated fiber.

7. The nozzle of claim 6 wherein the viscous thermosetting resin further comprises epoxy, polyester, urethane/polyurethane, phenolic, polyimide or cyanate ester/polycyanurate.

8. The nozzle of claim 6 wherein the fiber further comprises fiberglass, carbon, aramid, polyester and cotton or other plant-based fibers.

9. The nozzle of claim 6 wherein the nozzle is retracted away from the work surface before the encapsulated fiber is severed.

10. A method for three-dimensionally (3D) printing anadvanced composite part, comprising the steps of:

introducing filament polymer material into a first passage of a nozzle of a 3D printing device;

melting the polymer material as it moves through the first passage;

introducing a reinforcing fiber into a second passage of the nozzle;

introducing the reinforcing fiber into the molten polymer material at an interstitial cavity formed by the second passage where it extends partially into the first passage, the molten polymer material is cleaved by the second passage, wherein the molten polymer material encapsulates the reinforcing fiber to create an advanced composite; and depositing the advanced composite onto a work surface to form the advanced composite part.

11. The method of claim 10 wherein the polymer material is a thermoplastic filament.

12. The method of claim 11 wherein the thermoplastic filament further comprises PLA (polylactic acid), ABS (acrylonitrile butadiene styrene), PEI (Polyetherimide), nylon, polystyrene, PEEK (polyetherether ketone), PEKK (polyether ketone ketone) or PES (polyether sulfone).

13. The method of claim 10 wherein the fiber further comprises fiberglass, carbon, aramid, polyester and cotton or other plant-based fibers.

14. The method of claim 10 further comprising the step moving the nozzle over the work surface in a set of motion commands to create the advanced composite part.

15. The method of claim 14 further comprising the step of using a cutting device to sever the advanced composite after the completion of a motion command.

16. The method of claim 15, further comprising the step of optimizing the set of motion commands to eliminate termination points and make the advanced composite part in long continuous motions.

17. The method of claim 16, wherein at least one motion command further comprises moving the nozzle in a serpentine path back and forth across the work surface.

18. A method for three-dimensionally (3D) printing a fiber-reinforced advanced composite part, comprising the steps of:

introducing viscous thermosetting resin into a first passage of a nozzle of a 3D printing device;

introducing a reinforcing fiber into a second passage of the nozzle;

introducing the reinforcing fiber into the viscous thermosetting resin at an interstitial cavity formed by the second passage where it extends partially into the first passage, the viscous thermosetting resin is cleaved by the second passage, wherein the viscous thermosetting resin encapsulates the reinforcing fiber to create an advanced composite; and depositing the advanced composite on a work surface to form the advanced composite part.

19. The method of claim 18 wherein the thermosetting resin further comprises epoxy, polyester, urethane/polyurethane, phenolic, polyimide or cyanate ester/polycyanurate.

20. The method of claim 18 wherein the fiber further comprises fiberglass, carbon, aramid, polyester and cotton or other plant-based fibers.

21. The method of claim 18 further comprising the steps of:

heating the viscous thermosetting resin in the nozzle to initiate a curing process; and curing the completed advanced composite part after 3D printing is completed.

22. The method of claim 18 further comprising the step moving the nozzle over the work surface in a set of motion commands to create the advanced composite part.

23. The method of claim 22 further comprising the step of using a cutting device to sever the advanced composite after the completion of a motion command.

24. The method of claim 23, further comprising the step of optimizing the set of motion commands to eliminate termination points and make the advanced composite part in long continuous motions.

25. The method of claim 24, wherein at least one motion command further comprises moving the nozzle in a serpentine path back and forth across the work surface.

* * * * *